United States Patent
Purcell et al.

(10) Patent No.: US 8,605,102 B1
(45) Date of Patent: Dec. 10, 2013

(54) RASTERIZATION TILE COALESCER AND REORDER BUFFER

(75) Inventors: Timothy John Purcell, Provo, UT (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 577 days.

(21) Appl. No.: 12/651,367

(22) Filed: Dec. 31, 2009

Related U.S. Application Data

(60) Provisional application No. 61/249,923, filed on Oct. 8, 2009.

(51) Int. Cl.
*G09G 5/00* (2006.01)

(52) U.S. Cl.
USPC .......................................... 345/581; 345/530

(58) Field of Classification Search
USPC .............. 345/582, 440, 543, 581, 530; 712/2
See application file for complete search history.

(56) References Cited

U.S. PATENT DOCUMENTS

| | | | |
|---|---|---|---|
| 6,026,477 A * | 2/2000 | Kyker et al. | 712/2 |
| 6,657,635 B1 * | 12/2003 | Hutchins et al. | 345/543 |
| 7,577,762 B1 | 8/2009 | Garlick et al. | |
| 2003/0058244 A1 * | 3/2003 | Ramani et al. | 345/440 |
| 2003/0076331 A1 * | 4/2003 | Deering | 345/581 |
| 2003/0160789 A1 * | 8/2003 | Tang et al. | 345/440 |
| 2005/0001844 A1 * | 1/2005 | Naegle | 345/505 |
| 2005/0052449 A1 * | 3/2005 | Emberling | 345/418 |
| 2008/0049031 A1 * | 2/2008 | Liao et al. | 345/530 |
| 2009/0303245 A1 * | 12/2009 | Soupikov et al. | 345/582 |
| 2010/0060630 A1 * | 3/2010 | Nystad et al. | 345/419 |

* cited by examiner

*Primary Examiner* — Phi Hoang
(74) *Attorney, Agent, or Firm* — Patterson & Sheridan, LLP

(57) ABSTRACT

A raster unit generates graphic data for specific regions of a display device by processing each graphics primitive in a sequence of graphics primitives. A tile coalescer within the raster unit receives graphic data based on the sequence of graphics primitives processed by the raster unit. The tile coalescer collects graphic data for each region of the display device into a different bin before shading and then outputs each bin separately.

22 Claims, 12 Drawing Sheets

US 8,605,102 B1

RASTERIZATION TILE COALESCER AND REORDER BUFFER

CROSS-REFERENCE TO RELATED APPLICATIONS

This application claims the benefit of United States provisional patent application titled "Rasterization Tile Coalescer and Reorder Buffer," filed on Oct. 8, 2009 and having Ser. No. 61/249,923.

BACKGROUND OF THE INVENTION

1. Field of the Invention

Embodiments of the present invention relate generally to graphics processing, and, more specifically, to a rasterization tile coalescer and reorder buffer.

2. Description of the Related Art

In a conventional graphics pipeline, graphics primitives are received by a raster unit in a specific order, known as "API order." The raster unit rasterizes each graphics primitive into samples that reside within one or more specific screen regions, referred to as "screen tiles," and then sends a "packet" of samples associated with each screen tile to downstream units for further processing. The downstream units may perform memory access operations for each received packet.

When rasterizing a given graphics primitive, the raster unit may generate packets associated with several different screen regions spanned by that graphics primitive. The downstream units that receive these packets may then need to perform memory access operations that target different memory regions, where each different memory region stores data corresponding to a different packet. Accordingly, processing packets of samples on a per-primitive basis may cause a sequence of non-local memory access operations. Non-local memory access operations are inefficient and may reduce the throughput of a graphics pipeline.

Accordingly, what is needed is a more efficient technique for sending packets of samples to downstream units in a graphics processing pipeline.

SUMMARY OF THE INVENTION

Embodiments of the invention include a method for re-ordering samples of graphic data associated with a plurality of graphics primitives. The method includes the steps of performing a rasterization operation associated with the plurality of graphics primitives to generate a plurality of samples of graphic data, identifying a first sample of graphic data within the plurality of samples, where the first sample is associated with a first graphics primitive and with a first screen location, and storing the first sample in a first bin that resides within a tile coalescer, where the first bin corresponds to the first screen location. The method further includes the steps of identifying a second sample of graphic data within the plurality of samples, where the second sample is associated with a second graphics primitive and with the first screen location, storing the second sample in the first bin, and transmitting the first sample and the second sample from the first bin to at least one processing unit prior to performing shading operations involving the first sample and the second sample.

One advantage of the invention is that collecting samples of graphic data into bins allows memory access operations performed when processing the samples to be localized to a single frame buffer bank, thereby decreasing memory access latencies associated with processing the samples.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
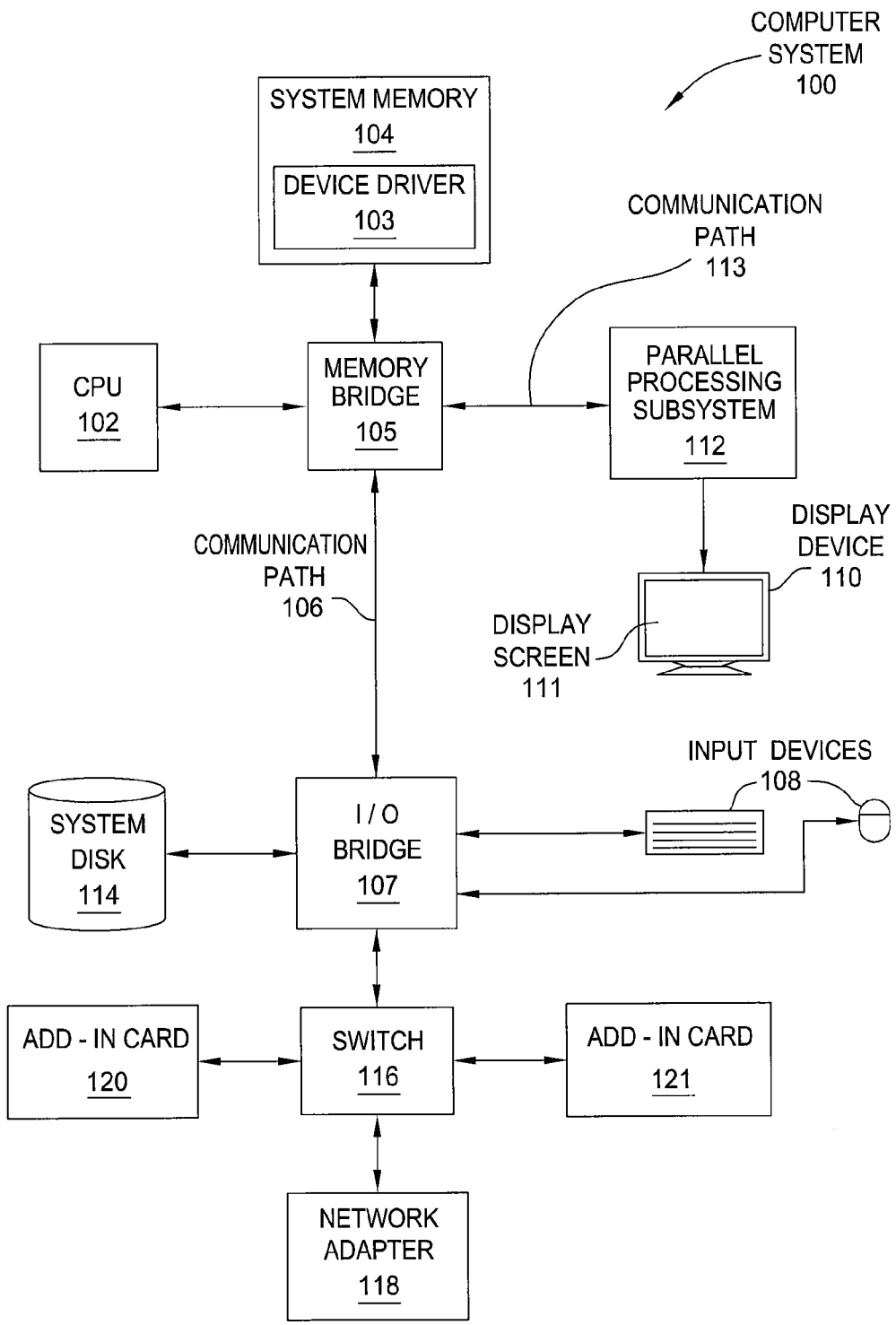
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
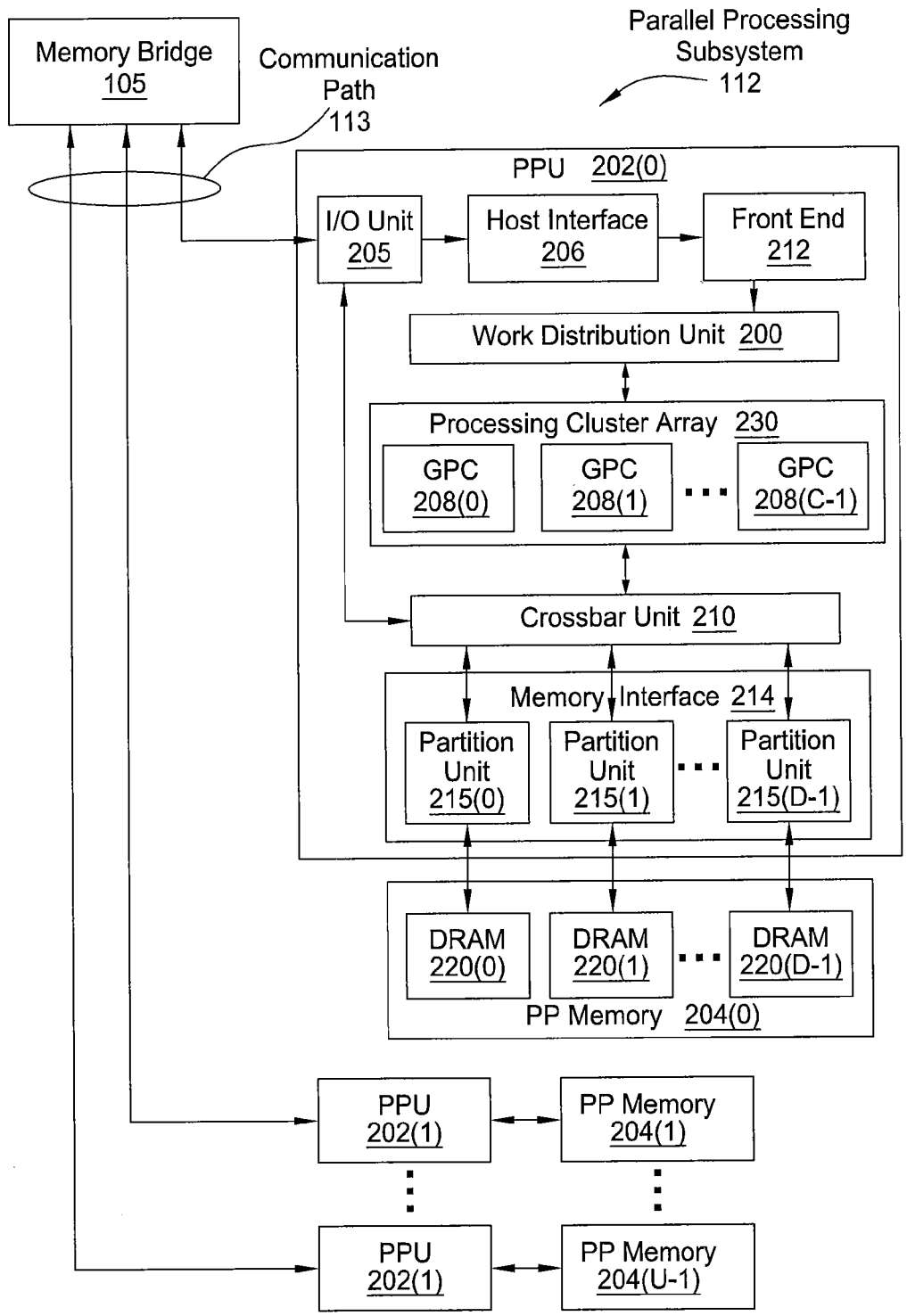
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
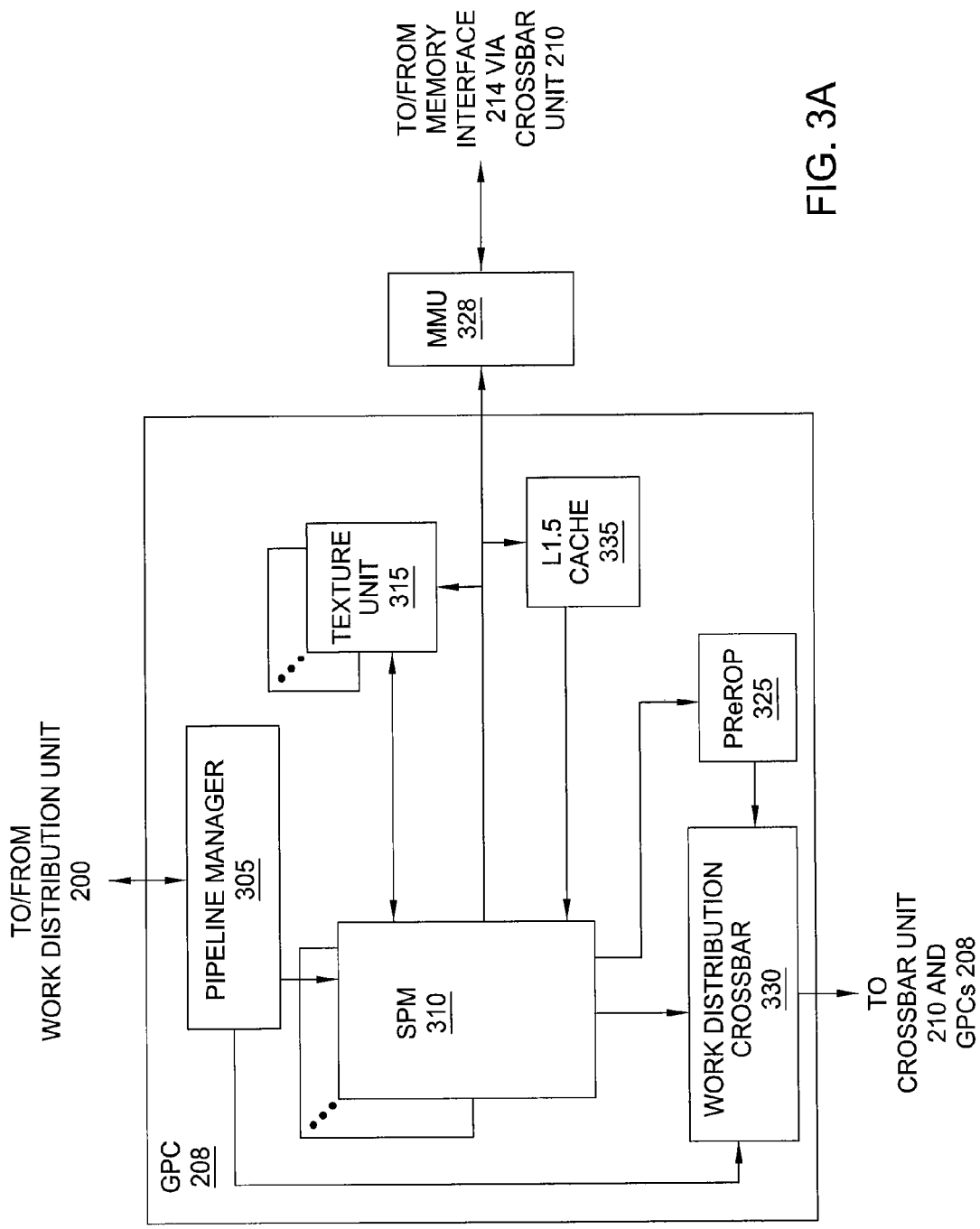
FIG. 3A is a block diagram of a GPC within one of the PPUs of FIG. 2, according to one embodiment of the invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
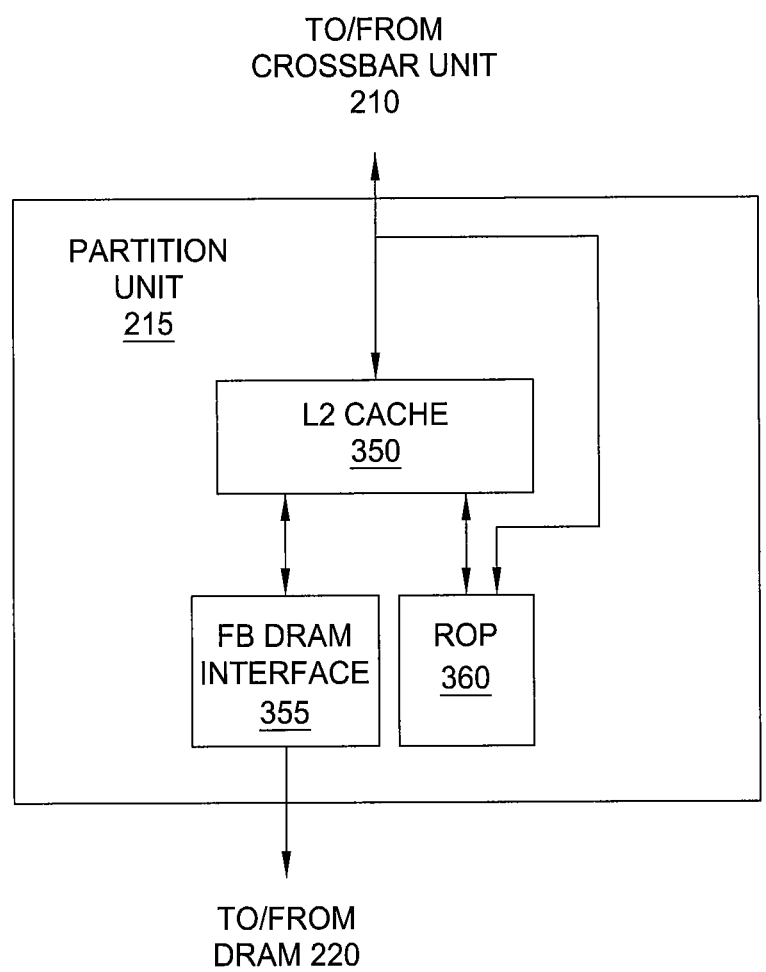
FIG. 3B is a block diagram of a partition unit within one of the PPUs of FIG. 2, according to one embodiment of the invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
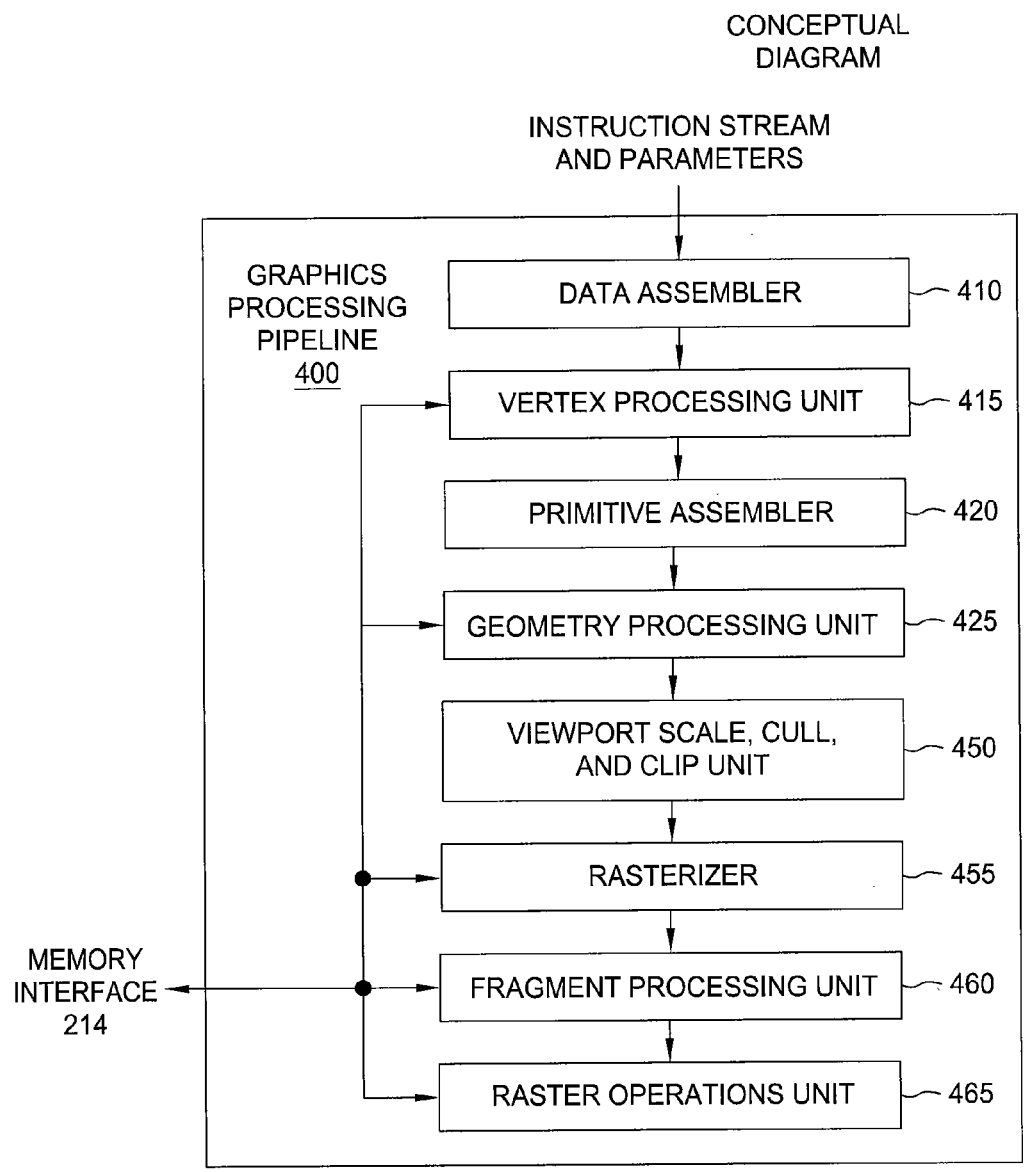
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Rasterization Tile Coalescer and Reorder Buffer

Figure 5:
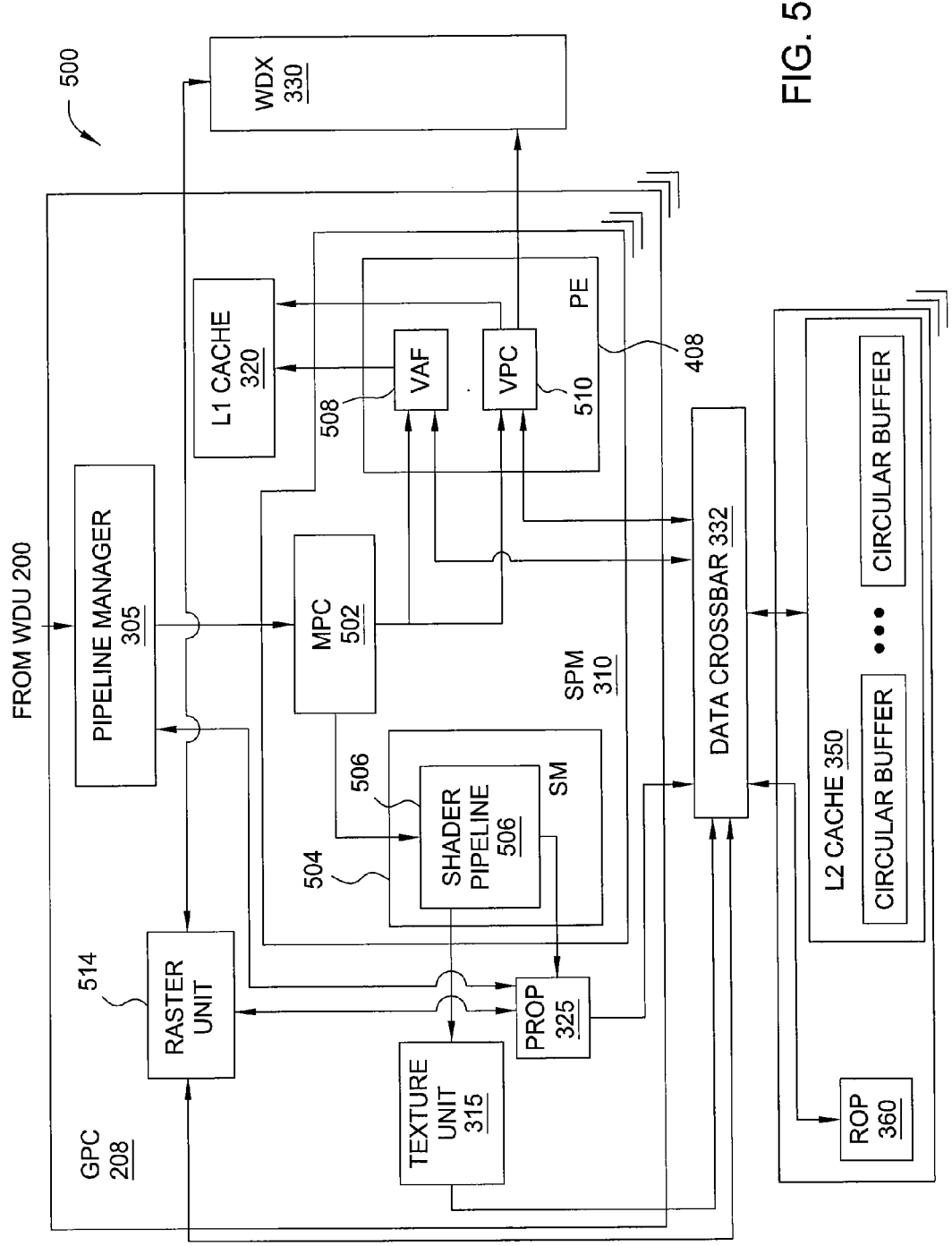
FIG. 5 is a computer system configured to process graphics data, according to one embodiment of the invention.

FIG. 5 is a computer system 500 configured to process graphics data, according to one embodiment of the invention. Computer system 500 includes the GPC 208 shown in FIG. 3A. GPC 208 includes a plurality of SPMs 310 such as the SPM 310 shown in FIG. 3C. Each SPM 310 includes an Mpipe controller (MPC) 502, a shader multiprocessor (SM) 504, and a primitive engine (PE) 408.

Each SPM 310 within GPC 208 is managed by a pipeline manager 305 that (i) receives a batch of graphics data (a "batch") from WDU 200 and (ii) distributes the batch to one of the MPCs 502 for processing. The batch includes primitive descriptors, i.e., data specifying different types of graphics primitives, including lines, triangles, and so forth. The batch also includes vertex attribute indices, i.e. indices that reference vertex attributes associated with the graphics primitives, including position attributes, color attributes, and so forth. MPC 502 receives the graphics data and configures SM 504 and PE 408 for performing graphics processing operations associated with the batch. MPC 502 then transmits the batch to PE 408.

PE 408 includes a vertex attribute fetch engine (VAF) 508 and a viewpoint culling engine (VPC) 510. VAF 508 receives the batch from MPC 702 and extracts the attribute indices. VAF 508 retrieves the vertex attributes specified by the vertex attribute indices and stores the fetched attributes, along with the corresponding primitive descriptions, in L1 cache 320.

Once VAF 508 has finished storing the fetched attributes, MPC 502 executes vertex processing unit 415 with the vertex attributes. In one embodiment, vertex processing unit 415 executes tessellation control shader 416, tessellation evaluation shader 417, and geometry processing unit 425. Once vertex processing unit 415 has completed, MPC 502 transmits the output of vertex processing unit 415 to VPC 510 for processing.

VPC 510 generates graphics primitives using the processed vertex attributes and primitive descriptions stored in L1 cache 320. VPC 510 then performs clipping, culling, perspective correction and viewport scaling operations on the processed vertex attributes and the graphics primitives. VPC 510 transmits processed vertex attributes to data crossbar (x-bar) 332.

Data crossbar 332 is configured to distribute vertex attributes to circular buffers (CBs) 512. Data crossbar 332 may store vertex attributes within any of the L2 caches on PP subsystem 112. VPC 510 receives a set of circular buffer entry pointers, referred to herein as "CBE pointers," that indicate the location of each vertex attribute stored in circular buffers 512.

VPC 510 also determines routing information for the graphics primitives. Each graphics primitive is routed to a raster unit that rasterizes graphics primitives and fragments of graphics primitives that overlap a particular region of the display. VPC 510 performs a bounding-box calculation with the graphics primitives to determine which region of the display each graphics primitive overlaps. VPC 510 transmits the graphics primitives and the CBE pointers used to identify the vertex attributes associated with the graphics primitives to WDX 330, along with the routing information. WDX 330 then transmits the graphics primitives and the CBE pointers to the relevant raster unit, such as raster unit 514.

Raster unit 514 receives graphics primitives and CBE pointers from WDX 330 and fetches vertex attributes from circular buffers 512 based on the CBE pointers. Raster unit 514 then rasterizes samples associated with some or all of those graphics primitives. Raster unit 514 also includes a "tile coalescer" configured to collect samples that are all associated with a given region of the display screen, as described in greater detail below in conjunction with FIG. 6. Raster unit 514 transmits grouped samples to PROP 325.

PROP 325 performs pre-processing operations on tiles received from raster unit 514. PROP 325 also notifies the tile coalescer within raster unit 514 when subsequent processing operation associated with a given tile are complete. PROP 325 may invoke the shader pipeline 506 which, in turn, invokes texture unit 315 to perform processing operations with grouped samples. Texture unit 315 performs texture mapping operations, e.g., determining texture sample positions, reading texture data, and filtering the texture data. Texture data is fetched from memory via data crossbar 332 as needed. Texture unit 315 may be configured to store the texture data in an internal cache. In some embodiments, texture unit 315 is coupled to L1 cache 320, and texture data is stored in L1 cache 320.

PROP 325 transmits pre-processed tiles to ROP 360. ROP 360 is a processing unit that performs raster operations, such as stencil, z test, and the like, and outputs sample data as processed graphics data. In some embodiments of the present invention, ROP 360 is configured to compress z or color data that is written to memory and decompress z or color data that is read from memory. Processed graphics data output by ROP 360 may be routed through data L2 cache 350 to parallel processing memory 204, and/or system memory 104, for display on display device 110 or for further processing by CPU 102 or parallel processing subsystem 112.

Figure 6:
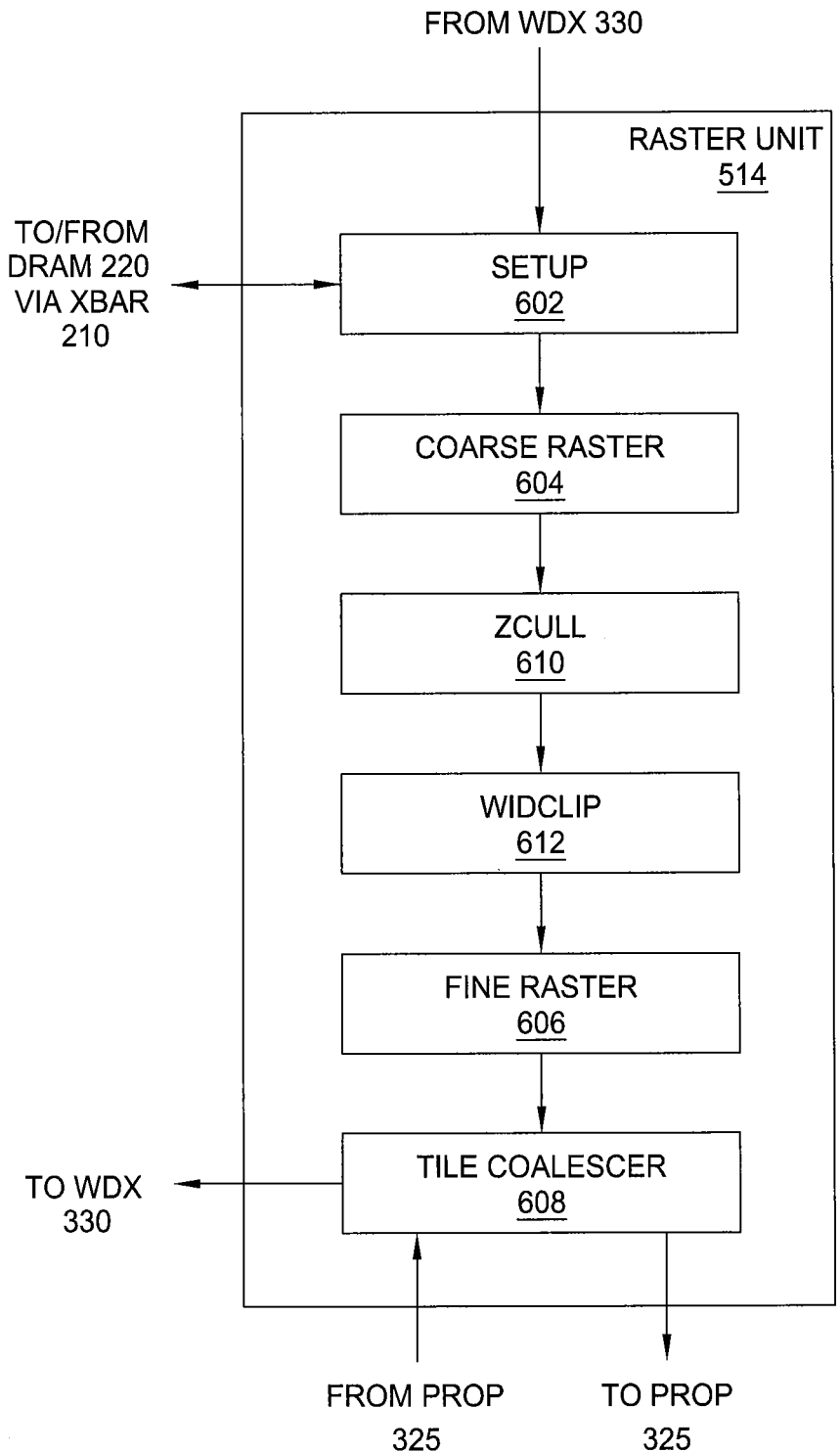
FIG. 6 is a block diagram of a raster unit within the computer system of FIG. 5, according to one embodiment of the invention.

FIG. 6 is a block diagram of raster unit 514 within the computer system 500 of FIG. 5, according to one embodiment of the invention. Raster unit 514 rasterizes samples associated with one or more specific screen regions for each graphics primitive received from WDX 330. In one embodiment, each screen region is 16 pixels by 16 pixels.

As shown, raster unit 514 includes a setup 602, a coarse raster 604, a zcull 610, a widclip 612, a fine raster 606, and a tile coalescer 608. Raster unit 514 receives the graphics primitives and CBE pointers from WDX 330 into setup 602. Setup 602 is a hardware unit configured to retrieve position attributes for each graphics primitive based on the CBE pointers associated with the graphics primitives. Setup 602 then calculates a set of edge equations for each graphics primitive and transmits the graphics primitive, CBE pointers, and associated set of edge equations to coarse raster 604.

Coarse raster 604 is a hardware unit configured to generate coverage data for the screen regions with which raster unit 514 is associated based sets of edge equations received from setup 602. For each screen region associated with raster unit 514 and for each graphics primitive, coarse raster 604 divides the screen region into several smaller sub-regions and determines which of the sub-regions are covered by the graphics primitive, thereby generating coverage data for that screen region. In embodiments where the screen region is 16 pixels by 16 pixels, coarse raster 604 divides the screen region into four 8-pixel by 8-pixel sub-regions and generates coverage data specifying which sub-regions are covered by the graphics primitive. Coarse raster 604 outputs the coverage data for each screen region as a "coarse raster tile." Coarse raster 604 outputs one or more coarse raster tiles for each graphics primitive, along with CBE pointers for that primitive, to zcull 610. Zcull 610 culls zero or more coarse raster tiles based on the z-positions associated with those tiles. Zcull 610 culls zero or more coarse raster tiles based on the z-positions associated with those tiles. Zcull 610 outputs coarse raster tiles to widclip 612. Widclip 612 computes further coverage information for the coarse raster tile and sequentially sends the 8-pixel by 8-pixel sub-regions to fine raster 606.

Fine raster 606 receives the 8-pixel by 8-pixel sub-regions from widclip 612 and generates fine-grained coverage data for each coarse raster tile. Fine raster 606 generates 8×8-sample "fine raster tiles" that have coverage data specifying which of the 8×8 samples lie within the primitive. Fine raster 606 outputs one or more fine raster tiles for each coarse raster tile, along with the CBE pointer for that coarse raster tile, to tile coalescer 608.

Tile coalescer 608 receives fine raster tiles from fine raster 606 on a per primitive basis. The order with which tile coalescer 608 receives the fine raster tiles is based on the order with which raster unit 514 initially receives the graphics primitives from WDX 330. Tile coalescer 608 receives the fine raster tiles and stores tile IDs for each fine raster tile in different "bins." Each bin stores tile IDs for fine raster tiles from a different screen region with which raster unit 514 is associated.

Tile coalescer 608 outputs the fine raster tiles associated with each bin and corresponding CBE pointers to PROP 325 when certain events occur. These events, referred to herein as "flush events," are discussed in greater detail below in conjunction with FIG. 7. As also discussed in conjunction with FIG. 7, tile coalescer 325 is configured to determine when all pixels for a given graphics primitive have been rasterized and to free a CBE pointer associated with such a graphics primitive.

Figure 7:
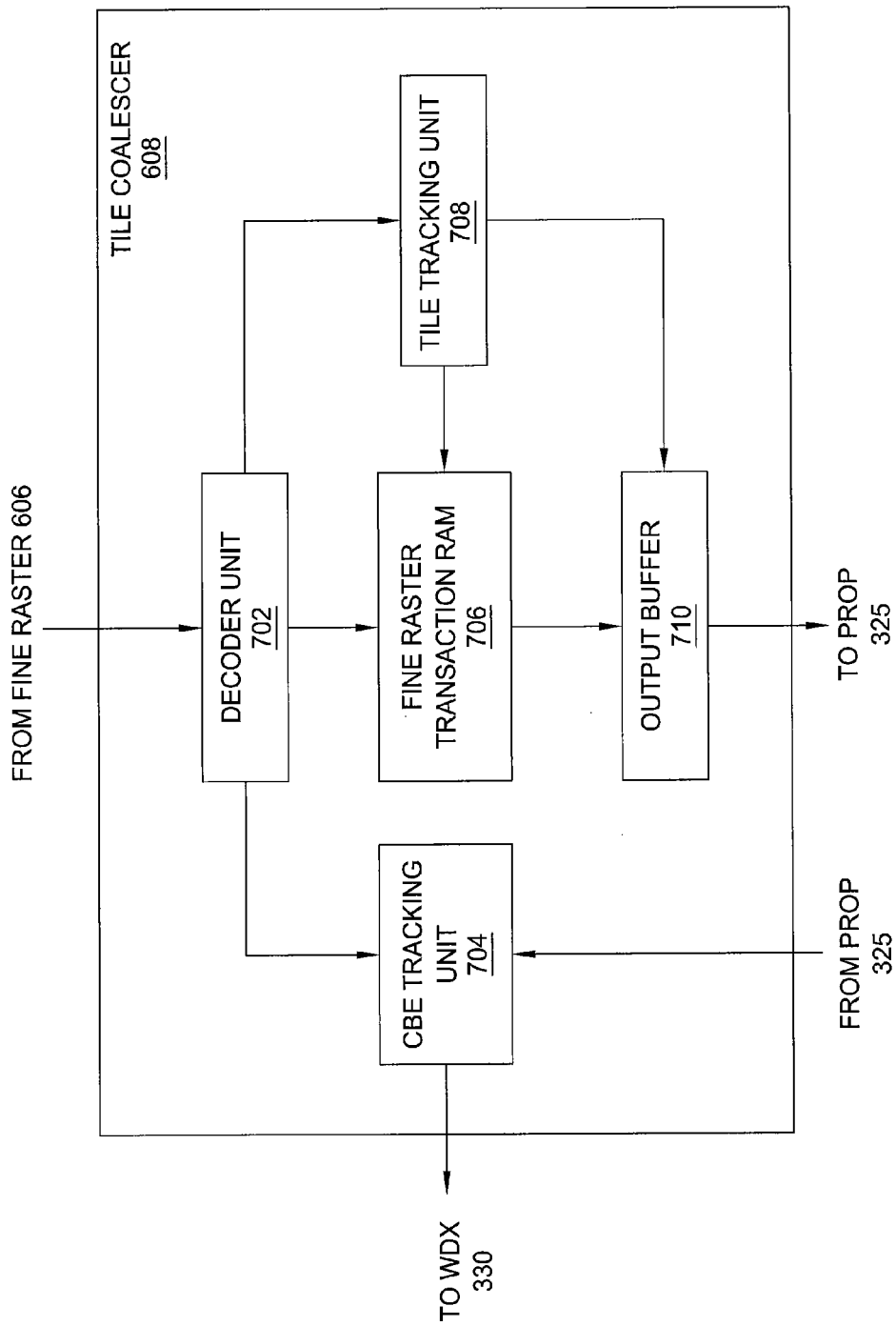
FIG. 7 is a block diagram of a tile coalescer within the raster unit of FIG. 6, according to one embodiment of the invention.

FIG. 7 is a block diagram of tile coalescer 608 within raster unit 514 of FIG. 6, according to one embodiment of the invention. As shown, tile coalescer 608 includes a decoder unit 702, a CBE tracking unit 704, a fine raster transaction RAM 706, a tile tracking unit 708, and an output buffer 710.

Tile coalescer 608 receives fine raster tiles and associated CBE pointers from fine raster 606 into decoder unit 702. Decoder unit 702 transmits the CBE pointers associated with the fine raster tiles to CBE tracking unit 704 and transmits the fine raster tiles to fine raster transaction RAM 706. Decoder unit 702 also decodes an address associated with the fine raster tile to generate an X, Y address that corresponds to a particular X, Y position on the display screen. Decoder 702 transmits decoded addresses associated with the fine raster tile to tile tracking unit 708.

Tile tracking unit 708 maintains a set of "bins," as described above in conjunction with FIG. 6. Again, each bin stores tile IDs for one or more fine raster tiles associated with a particular screen region. Tile tracking unit 708 may include a number of bins that is less than or equal to the number of screen regions with which raster unit 514 is associated. In one embodiment, tile tracking unit 708 creates new bins as needed based on the fine raster tiles received from fine raster 606. Tile tracking unit 708 identifies the appropriate bin in which to store the tile ID for a given fine raster tile by masking the least significant bits of the X, Y position of that tile. The remaining bits specify a particular screen region. Tile tracking unit 708 identifies the bin corresponding to that screen region and stores the tile ID within the identified bin.

Tile tracking unit 708 is configured to output all of the fine raster tiles associated with a given bin when certain flush events occur. For example, when a particular bin stores a threshold number of addresses, tile tracking unit 708 flushes that bin, thereby causing fine raster transaction RAM 706 to output all of the fine raster tiles associated with the bin to output buffer 710. Output buffer 710 then transmits the fine raster tiles to PROP 325. Tile tracking unit 708 may also flush a particular bin after a certain timeout value associated with the bin. Those skilled in the art will recognize that the flushing of bins may be tied to any event or combination of events.

PROP 325 receives tile coalescer tiles (coalesced fine raster tiles, i.e. the set of fine raster tiles from particular bins), from output buffer 710. PROP 325 and subsequent processing units, such as ROP 365, then perform processing operations with those tile coalescer tiles.

Coalescing fine raster tiles that occupy the same screen region using the techniques described herein may allow memory access operations performed when processing those fine raster tiles (e.g., texture fetches, etc.) to be localized to a single frame buffer bank corresponding to the screen region. Localizing memory access operations in this manner may improve the throughput of PPU 202.

When the fine raster tiles are processed by subsequent processing units, PROP 325 tracks the fine raster tiles from each tile coalescer tile and determines when processing operations for each fine raster tile have been completed. When the processing operations for all fine raster tiles from a given tile coalescer tile have been completed, PROP 325 transmits the ID associated with that tile coalescer tile to CBE tracking unit 704. CBE tracking unit 704 is configured to maintain a list of tile coalesce tiles associated with each CBE pointer. When all of the tile coalescer tiles associated with a given CBE pointer have been processed, CBE tracking unit 704 causes one or more CBE pointers associated with those tiles to be freed via crossbar 210.

In the fashion described above, tile coalescer 608 performs two separate functions. First, tile coalescer 608 coalesces fine raster tiles associated with the same screen regions prior to the performance of shading operations involving those tiles. Second, tile coalescer frees CBE pointers associated with the fine raster tiles when the CBE pointers are no longer needed. The "coalescing" functionality of tile coalescer 608 is illustrated by way of example below in conjunction with FIG. 8.

Figure 8:
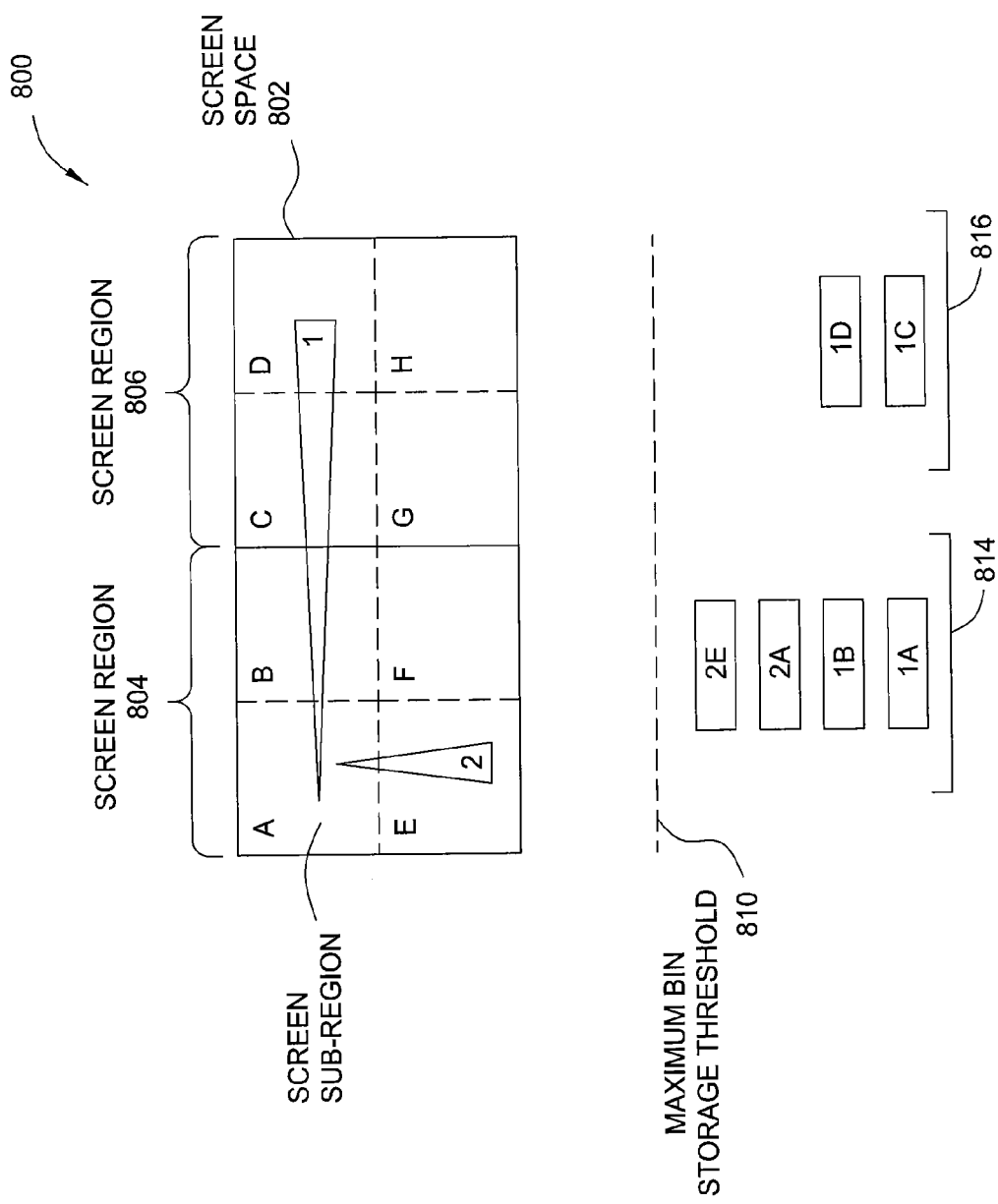
FIG. 8 is a conceptual diagram illustrating fine raster tiles being coalesced, according to one embodiment of the invention.

FIG. 8 is a conceptual diagram 800 illustrating fine raster tiles being coalesced, according to one embodiment of the invention. As shown, conceptual diagram 800 includes screen space 802. Screen space 802 includes a graphics image that, upon subsequent processing operations, will be displayed on display device 110. Screen space 802 is divided into a screen regions 804 and screen regions 806. Screen region 804 is divided into screen sub-regions A, B, E, and F, while screen region 806 is divided into screen sub-regions C, D, G, and H. Screen space 802 displays triangles 1 and 2. Triangles 1 and 2 represent exemplary graphics primitives.

As previously described, raster unit 514 is associated with specific screen regions. In the example described herein, raster unit 514 is associated with screen regions 804 and 806. Coarse raster 604 within raster unit 514 is configured to generate coarse raster tiles for screen regions 804 and 806. Fine raster 606 is configured to generate fine raster tiles for screen sub-regions A, B, E, and F when processing a coarse raster tile associated with screen region 804. Likewise, fine raster 606 is configured to generate fine raster tiles for screen sub-regions C, D, G, and H when processing a coarse raster tile associated with screen region 806. As also previously described, fine raster 606 outputs fine raster tiles on a per primitive basis. Accordingly, fine raster 606 outputs fine raster tiles for screen sub-regions A, B, C, and D in order to process triangle 1. Fine raster 606 then outputs fine raster tiles for screen regions A and E in order to process triangle 2.

Tile coalescer 608 is configured to receive the fine raster tiles for triangles 1 and 2 and to coalesce those fine raster tiles using bins 814 and 816. Bin 814 includes data specifying fine raster tiles associated with screen region 804, while bin 816 includes data specifying fine raster tiles associated with screen region 806. The data specifying the respective fine raster tiles could be, e.g., a coarse raster tile ID or a tile address, among others.

When the number of fine raster tiles specified by a bin 808 reaches a maximum bin storage threshold 810, tile coalescer 608 transmits the fine raster tiles specified by that bin to PROP 325 as a tile coalescer tile. In various other embodiments, different flush events trigger tile coalescer 608 to transmit fine raster tiles associated with a bin 808 to PROP 325. Through these techniques, tile coalescer 608 implements the "coalescing" functionality discussed in conjunction with FIGS. 5-7.

Figure 9:
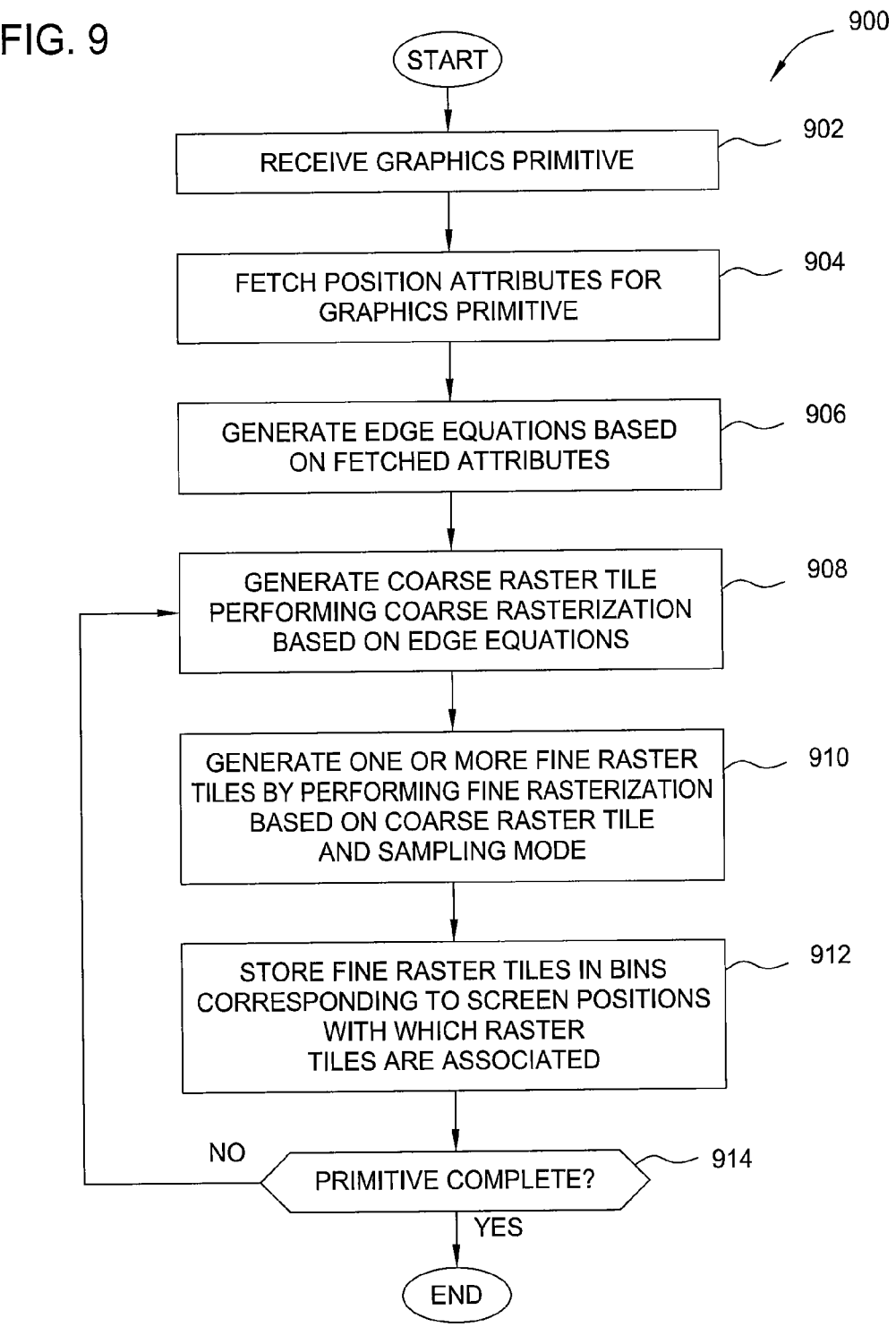
FIG. 9 is a flowchart of method steps for generating a screen tile, according to one embodiment of the invention.

FIG. 9 is a flowchart of method steps for generating a tile coalescer tile, according to one embodiment of the invention. Persons skilled in the art will understand that, although the method 900 is described in conjunction with the systems of FIG. 1-7, any system configured to perform the method steps, in any order, is within the scope of the present invention.

As shown, the method 900 begins at step 902, where setup 602 within raster unit 514 receives a graphics primitive. The graphics primitive may be any type of graphics primitive, including a line, a triangle, or a rectangle, among others. Setup 602 also receives a CBE pointer associated with the graphics primitive. At step 904, setup 602 fetches position attributes associated with the graphics primitive using the CBE pointer associated with the graphics primitive. At step 906, setup 602 generates a set of edge equations for the graphics primitive. Setup 602 then transmits the graphics primitive, the CBE pointer associated with the graphics primitive, and the set of edge equations to coarse raster 604.

At step 908, coarse raster 604 generates a coarse raster tile by performing a coarse rasterization with the graphics primitive based on the edge equations received from setup 602. The coarse raster tile includes coverage data specifying particular screen sub-regions covered by the graphics primitive. Coarse raster 604 outputs the coarse raster tile to fine raster 606. In various embodiments, coarse raster 605 outputs the coarse raster tile to zcull 610. Zcull 610 performs culling operations and outputs coarse raster tiles to widclip 612. Widclip 612 add additional coverage information to the coarse raster tile and outputs the 8-pixel by 8-pixel sub-regions sequentially to fine raster 606.

At step 910, fine raster 606 performs a fine rasterization. Fine raster 606 receives the 8-pixel by 8-pixel sub-regions from widclip 612 and generates fine-grained coverage data for each coarse raster tile. Fine raster 606 generates 8×8-sample "fine raster tiles" that have coverage data specifying which of the 8×8 samples lie within the primitive. Fine raster 606 outputs one or more fine raster tiles for each graphics primitive, along with CBE pointers for that graphics primitive, to tile coalescer 608.

At step 912, tile coalescer 608 stores the fine raster tiles received from fine raster 606 in a bin corresponding to the screen region with which the fine raster tile is associated. The bin could be, e.g., one of the bins 808 illustrated in FIG. 8.

At step 914, raster unit 514 determines whether processing of the graphics primitive is complete. When raster unit 514 determines that processing of the graphics primitive is not complete, the method 900 returns to step 908 and proceeds as described above. If raster unit 514 determines that processing of the graphics primitive is complete, then the method 900 ends.

The method 900 thus describes a technique through which raster unit 514 processes a graphics primitive. A more specific technique for coalescing fine raster tiles is discussed below in conjunction with FIG. 10.

Figure 10:
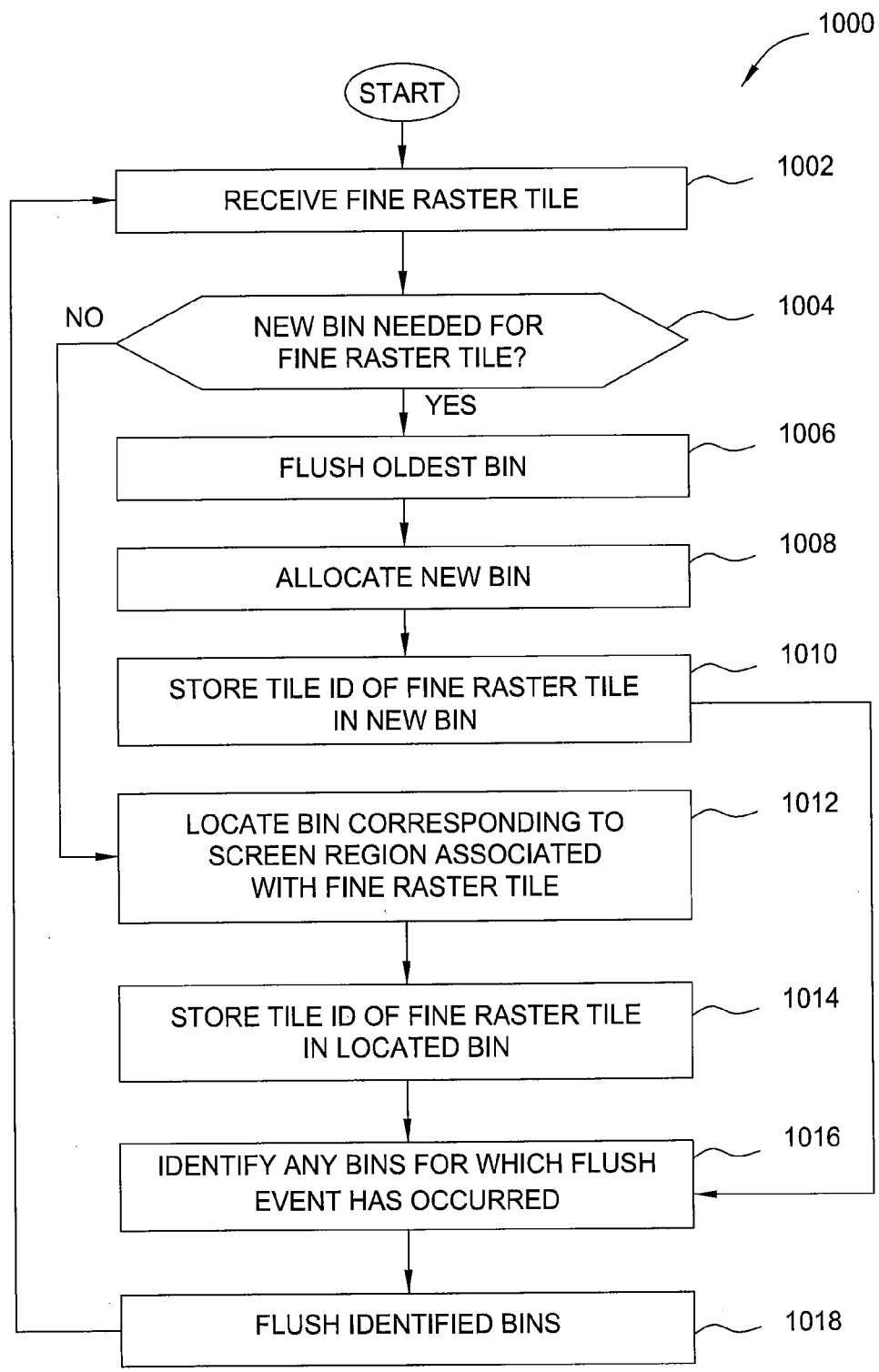
FIG. 10 is a flowchart of method steps for coalescing fine raster tiles into screen tiles, according to one embodiment of the invention.

FIG. 10 is a flowchart of method steps for coalescing fine raster tiles into screen tiles, according to one embodiment of the invention. Persons skilled in the art will understand that, although the method 1000 is described in conjunction with the systems of FIG. 1-7, any system configured to perform the method steps, in any order, is within the scope of the present invention.

As shown, the method 1000 begins at step 1002, where decoder unit 702 within tile coalescer 608 receives a fine raster tile from fine raster 606. Decoder unit 702 decodes an address associated with the fine raster tile to generate an X, Y address that corresponds to a particular X, Y position on the display screen. Decoder unit 702 transmits the decoded address associated with the fine raster tile to tile tracking unit 708.

At step 1004, tile tracking unit 708 determines whether a new bin is needed for the fine raster tile. If tile tracking unit 708 determines that a new bin is needed, then the method 1000 proceeds to step 1006. At step 1006, tile tracking unit 708 flushes the oldest bin. At step 1008, tile tracking unit 708 allocates a new bin for the fine raster tile. At step 1010, tile tracking unit 708 stores the fine raster tile in the new bin. The method 1000 then proceeds to step 1016.

At step 1004, if tile tracking unit 708 determines that a new bin is not needed, then the method 1000 proceeds to step 1012. At step 1012, tile tracking unit 708 locates the bin corresponding to the screen region associated with which the fine raster tile is associated. Tile tracking unit 708 identifies the appropriate bin in which to store the tile ID for a given fine raster tile by masking the least significant bits of the X, Y position of that tile. The remaining bits specify a particular screen region. Tile tracking unit 708 identifies the bin corresponding to that screen region.

At step 1014, tile tracking unit 708 stores a tile ID associated with the fine raster tile in the located bin. The located bin may include tile IDs associated with other fine raster tiles generated for other graphics primitives. At step 1016, tile tracking unit 708 identifies zero or more bins for which a flush event has occurred. A flush event may occur when a bin includes a threshold number of tile IDs of fine raster tiles, or, alternatively, a predetermined amount of time has elapsed since the bin was created, among other events.

At step 1018, tile tracking unit 708 flushes any bins that were identified at step 1016, if any. In doing so, tile tracking unit 708 causes the fine raster tiles specified by the identified bins to be output to output buffer 710. Output buffer 710 then outputs the fine raster tiles to PROP 325. The method then returns to step 1002 and proceeds as described above.

By implementing the technique described above, tile coalescer 708 (i) coalesces fine raster tiles associated with specific screen regions and (ii) transmits the coalesced fine raster tiles when specific flush events occur.

Figure 11:
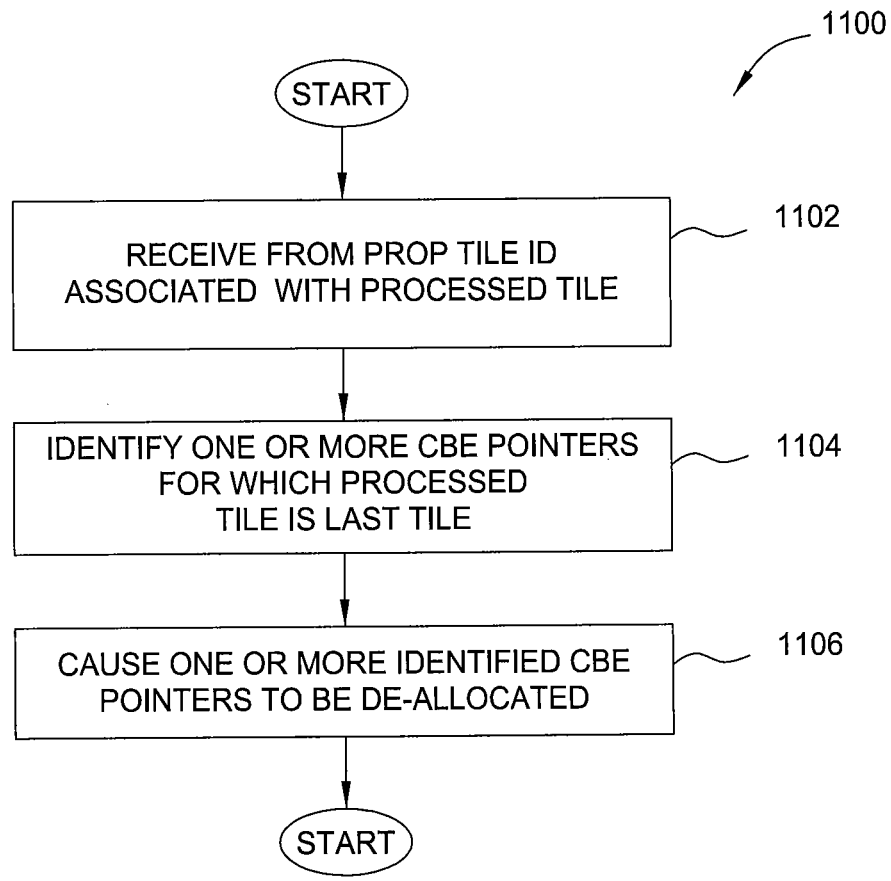
FIG. 11 is a flowchart of method steps for freeing a circular buffer entry, according to one embodiment of the invention.

FIG. 11 is a flowchart of method steps for freeing a circular buffer entry, according to one embodiment of the invention. Persons skilled in the art will understand that, although the method 1100 is described in conjunction with the systems of FIG. 1-7, any system configured to perform the method steps, in any order, is within the scope of the present invention.

As shown, the method 1100 begins at step 1102, where CBE tracking unit 704 receives a tile ID associated with a tile coalescer tile processed by PROP 325 and/or subsequent processing units. In one embodiment, tile coalescer 708 assigns a "tile coalescer tile ID" to each bin when coalescing the fine raster tiles, and CBE tracking unit 704 receives the tile coalescer tile ID associated with the tile. At step 1104, CBE tracking unit 704 identifies one or more CBE pointers for which the tile associated with the received tile ID is the last tile. At step 1106, CBE tracking unit 704 causes the identified CBE pointer(s) to be de-allocated. In one embodiment, the CBE tracking unit 704 causes the identified CBE pointer(s) to be freed by de-allocating memory associated with the identified CBE pointer. The method 1100 then ends.

In sum, a tile coalescer receives tiles of processed graphics data associated with one or more graphics primitives. The graphics primitives may span many different regions of a display screen. The tile coalescer collects, or coalesces, tiles associated with the same regions of the display screen, and transmits coalesced tiles to subsequent processing units.

Advantageously, coalescing fine raster tiles in the manner described herein allows memory access operations performed when processing the fine raster tiles to be localized to a single frame buffer bank, thereby decreasing memory access latencies associated with processing the fine raster tiles, and, thus, improving the throughput of PPU 202.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed:

1. A method for re-ordering samples of graphic data associated with a plurality of graphics primitives, the method comprising:
   performing a rasterization operation associated with the plurality of graphics primitives to generate a plurality of samples of graphic data;
   identifying a first sample of graphic data within the plurality of samples, wherein the first sample is associated with a first graphics primitive and with a tile associated with a first screen location;
   storing the first sample in a first bin that resides within a tile coalescer, wherein the first bin corresponds to the tile;
   identifying a second sample of graphic data within the plurality of samples, wherein the second sample is associated with a second graphics primitive and with the tile;
   storing the second sample in the first bin; and
   transmitting the first sample and the second sample from the first bin to at least one processing unit prior to performing shading operations involving the first sample and the second sample;
   wherein the step of transmitting the first sample and the second sample comprises determining that an additional bin is required to store additional samples associated with the tile.

2. The method of claim 1, wherein the step of storing the first sample comprises:
   determining an X, Y position for the first sample;
   masking the least significant bits of the X, Y position to generate a masked X, Y position; and
   identifying the first bin based on the masked X, Y position.

3. The method of claim 1, wherein the step of transmitting the first sample and the second sample comprises determining that the first bin stores a threshold number of samples of graphic data.

4. The method of claim 1, wherein the step of transmitting the first sample and the second sample comprises determining that a timeout value associated with the first bin has elapsed.

5. The method of claim 1, wherein one or more samples within the first bin are transmitted to the at least one processing unit in response to detecting an end-of-circular-buffer-entry flag.

6. The method of claim 1, wherein a first pointer is associated with the first sample and indicates one or more attributes associated with the first sample, the method further comprising:
   determining that the first sample has been processed by the at least one processing unit; and
   causing memory associated with the first pointer to be de-allocated.

7. The method of claim 6, wherein a notification is generated as the first sample is processed by the at least one processing unit, and the step of determining that the first sample has been processed by the at least one processing unit comprises receiving the notification from the at least one processing unit.

8. The method of claim 7, wherein the graphics processing operations performed by the at least one processing unit comprise shading operations.

9. The method of claim 1, wherein the first sample is derived from an 8-sample by 8-sample screen region within the tile, and the tile comprises a 16-pixel by 16-pixel screen region.

10. The method of claim 1, wherein the first processing unit performs frame buffer memory access operations that are localized to one frame buffer bank when processing the first sample and the second sample previously stored within the first bin.

11. A tile coalescing unit configured to re-order samples of graphic data associated with a plurality of graphics primitives by performing the steps of:
    receiving a plurality of samples of graphic data derived from the plurality of graphics primitives;
    identifying a first sample of graphic data within the plurality of samples, wherein the first sample is associated with a first graphics primitive and with a tile associated with a first screen location;
    storing the first sample in a first bin that resides within a tile coalescer, wherein the first bin corresponds to the tile;
    identifying a second sample of graphic data within the plurality of samples, wherein the second sample is associated with a second graphics primitive and with the tile;
    storing the second sample in the first bin; and
    transmitting the first sample and the second sample from the first bin to at least one processing unit prior to performing shading operations involving the first sample and the second sample;
    wherein the step of transmitting the first sample and the second sample comprises determining that an additional bin is required to store additional samples associated with the tile.

12. The tile coalescing unit of claim 11, wherein the step of storing the first sample comprises:
    determining an X, Y position for the first sample;
    masking the least significant bits of the X, Y position to generate a masked X, Y position; and
    identifying the first bin based on the masked X, Y position.

13. The tile coalescing unit of claim 11, wherein the step of transmitting the first sample comprises determining that the first bin stores a threshold number of samples of graphic data.

14. The tile coalescing unit of claim 11, wherein the step of transmitting the first sample comprises determining that a timeout value associated with the first bin has elapsed.

15. The tile coalescing unit of claim 11, wherein one or more samples within the first bin are transmitted to the at least one processing unit in response to detecting an end-of-circular-buffer-entry flag.

16. The tile coalescing unit of claim 11, wherein a first pointer is associated with the first sample and indicates one or more attributes associated with the first sample, and further comprising the steps of:
    determining that the first sample has been processed by the at least one processing unit; and
    causing memory associated with the first pointer to be de-allocated.

17. The tile coalescing unit of claim 16, wherein a notification is generated as the first sample is processed by the at least one processing unit, and the step of determining that the first sample has been processed by the at least one processing unit comprises receiving the notification from the at least one processing unit.

18. The tile coalescing unit of claim 17, wherein the graphics processing operations performed by the at least one processing unit comprise shading operations.

19. The tile coalescing unit of claim 11, wherein the first sample is derived from an 8-sample by 8-sample screen region within the tile, and the tile comprises a 16-pixel by 16-pixel screen region.

20. The tile coalescing unit of claim 11, wherein the at least one processing unit performs frame buffer memory access operations that are localized to one frame buffer bank when processing the first sample and the second sample previously stored within the first bin.

21. A computing device configured to re-order samples of graphic data associated with a plurality of graphics primitives, the computing device comprising:
   a rasterization unit configured to:
      perform a rasterization operation associated with the plurality of graphics primitives to generate a plurality of samples of graphic data; and
   a tile coalescing unit configured to:
      identify a first sample of graphic data within the plurality of samples, wherein the first sample is associated with a first graphics primitive and with a tile associated with a first screen location,
      store the first sample in a first bin that resides within a tile coalescer, wherein the first bin corresponds to the tile,
      identify a second sample of graphic data within the plurality of samples, wherein the second sample is associated with a second graphics primitive and with the tile,
      store the second sample in the first bin, and
      transmit the first sample and the second sample from the first bin to at least one processing unit prior to performing shading operations involving the first sample and the second sample;
      wherein the step of transmitting the first sample and the second sample comprises determining that an additional bin is required to store additional samples associated with the tile.

22. The computing device of claim 21, wherein a first pointer is associated with the first sample and indicates one or more attributes associated with the first sample, and the tile coalescing unit is further configured to:
   determine that the first sample has been processed by the at least one processing unit; and
   cause memory associated with the first pointer to be de-allocated.

* * * * *